Figure 1:
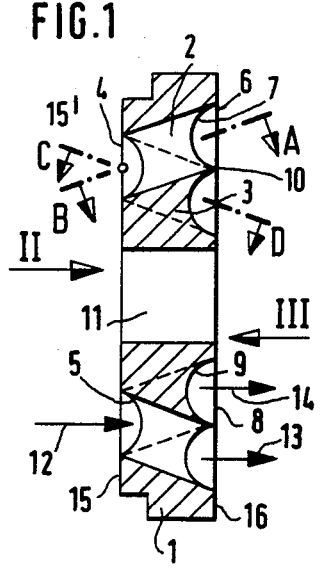

United States Patent [19]

Upmeier

[11] Patent Number: 4,541,982

[45] Date of Patent: Sep. 17, 1985

[54] PROCESS AND APPARATUS FOR FORMING AND REARRANGING PARTIAL STREAMS OF MOLTEN MATERIALS PROCESSED IN AN EXTRUDER FOR MAKING THERMOPLASTIC AND/OR ELASTOMERIC PRODUCTS

[75] Inventor: Hartmut Upmeier, Lengerich of Westphalia, Fed. Rep. of Germany

[73] Assignee: Windmöller & Holscher, Lengerich, Fed. Rep. of Germany

[21] Appl. No.: 558,357

[22] Filed: Dec. 5, 1983

[30] Foreign Application Priority Data

Dec. 6, 1982 [DE] Fed. Rep. of Germany ....... 3245084
May 11, 1983 [DE] Fed. Rep. of Germany ....... 3317347

[51] Int. Cl.$^4$ ............................................. B29D 7/22
[52] U.S. Cl. ................................ 264/349; 264/176 R; 425/198; 425/199; 425/207; 425/208; 425/378 R; 425/382 R
[58] Field of Search ............... 264/171, 349, 176 R; 425/131.1, 462, 208, 207, 144, 376 B, 378 R, 382 R, 198, 199

[56] References Cited

U.S. PATENT DOCUMENTS

| | | | |
|---|---|---|---|
| 2,469,999 | 5/1949 | Stober | 264/349 |
| 2,631,016 | 3/1953 | De Laubarede | 425/200 |
| 2,682,081 | 6/1954 | Fisch | 425/467 |
| 3,106,746 | 10/1963 | Sunday | 425/207 |
| 3,146,495 | 9/1964 | Sanford | 425/380 |
| 3,171,160 | 3/1965 | Moyer | 425/207 |
| 3,608,148 | 9/1971 | Sluijters | 264/171 |
| 3,609,806 | 10/1971 | Schippers et al. | 425/376 R |
| 3,682,443 | 8/1972 | Upmeier | 138/37 |
| 3,756,758 | 9/1973 | Prall | 425/467 |
| 3,802,825 | 4/1974 | Upmeier | 425/378 R |
| 3,852,013 | 12/1974 | Upmeier | 425/376 R |
| 3,911,073 | 10/1975 | Massance | 264/171 |
| 4,072,037 | 2/1978 | Fuch, Jr. | 425/463 |
| 4,150,932 | 4/1979 | Moghe | 425/467 |
| 4,454,087 | 6/1984 | Hayashi et al. | 425/207 |

FOREIGN PATENT DOCUMENTS

| | | | |
|---|---|---|---|
| 1197438 | 6/1961 | Fed. Rep. of Germany . | |
| 1926488 | 12/1970 | Fed. Rep. of Germany . | |
| 1956652 | 5/1971 | Fed. Rep. of Germany . | |
| 1954242 | 5/1971 | Fed. Rep. of Germany | 425/197 |
| 1959348 | 6/1971 | Fed. Rep. of Germany | 425/208 |
| 2129971 | 6/1971 | Fed. Rep. of Germany . | |
| 2006941 | 8/1971 | Fed. Rep. of Germany | 425/197 |
| 2023910 | 2/1972 | Fed. Rep. of Germany | 425/208 |
| 155504 | 6/1982 | German Democratic Rep. | 425/207 |
| 55-109642 | 8/1980 | Japan | 264/349 |
| 56-106846 | 8/1981 | Japan | 425/207 |
| 486300 | 2/1970 | Switzerland . | |

*Primary Examiner*—Jeffery Thurlow
*Attorney, Agent, or Firm*—Fleit, Jacobson, Cohn & Price

[57] ABSTRACT

A passage for transferring molten plastic material processed in an extruder contains distributing elements for dividing the molten stream into partial streams and for recombining said partial streams in a different relation to each other. In order to minimize boundary layer faults which result from the distribution of the partial streams, the molten stream is divided into partial streams by at least one annular distributing disc, which is provided on its entrance side with an annular series of openings, and in which adjacent ones of said openings are succeeded by bores which extend radially outwardly and radially inwardly, respectively, so that the molten stream is divided into sectorlike partial streams which are conducted radially inwardly and radially outwardly, respectively, in adjacent bores and are then recombined.

15 Claims, 17 Drawing Figures

FIG.6
FIG.7
FIG.8
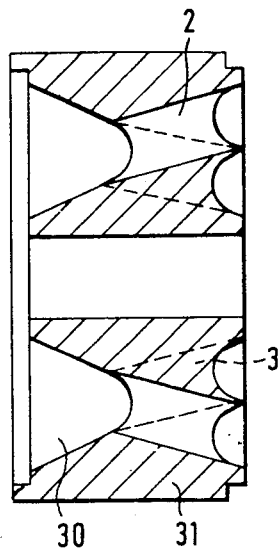
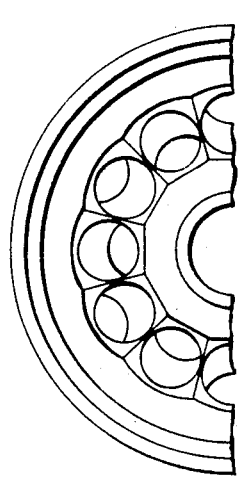
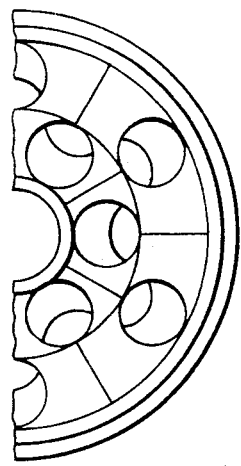
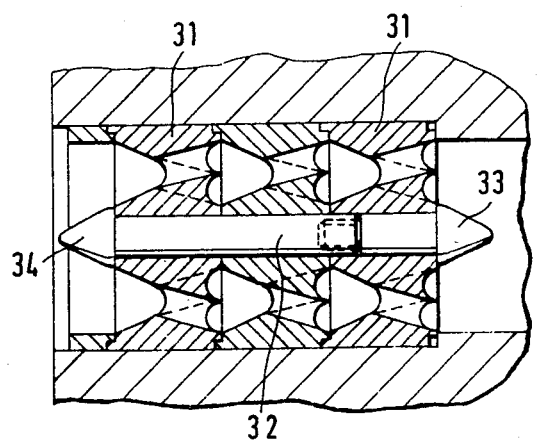
FIG.9

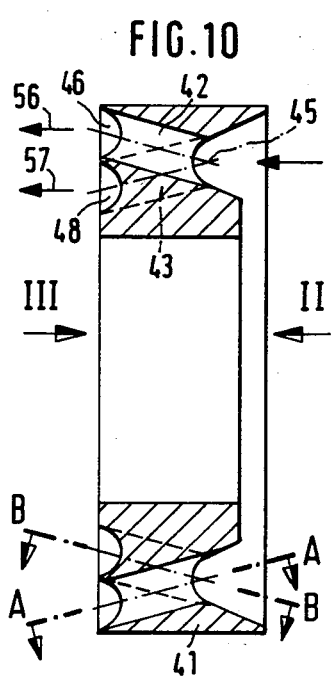
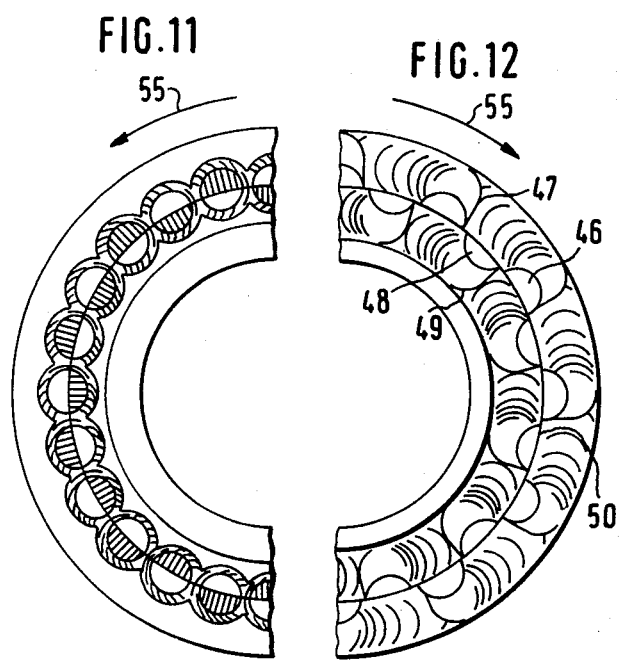
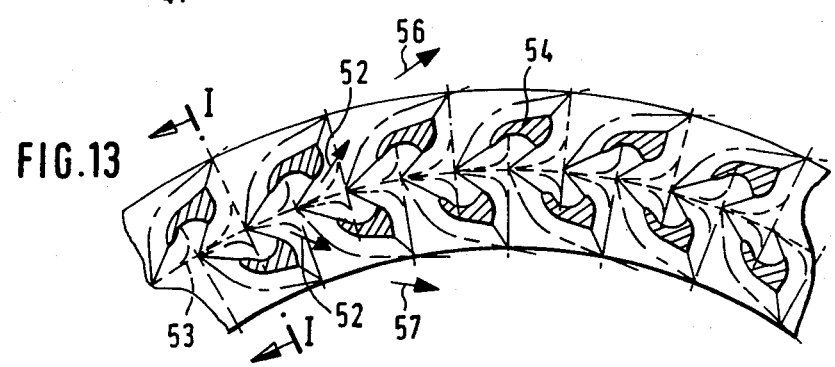
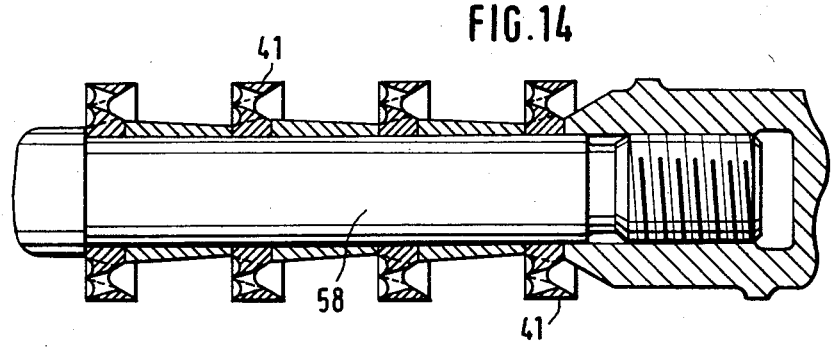

PROCESS AND APPARATUS FOR FORMING AND REARRANGING PARTIAL STREAMS OF MOLTEN MATERIALS PROCESSED IN AN EXTRUDER FOR MAKING THERMOPLASTIC AND/OR ELASTOMERIC PRODUCTS

This invention relates to a process of forming and rearranging partial streams of molten material which is processed in an extruder for making thermoplastic and/or elastomeric products, wherein a molten stream is divided into partial streams and the latter are recombined in a different relation to each other.

In the processing of plastic materials by an extruder for making elastomeric or thermoplastic products, inhomogenities regarding the temperature and viscosity of the material will occur in the passages in which the molten material is transferred to the die or in the distributing passages of the die. A special problem which arises is due to the boundary layers which are formed in the distributing passages by the material which adheres to the walls defining such passages or flows at a lower velocity and which owing to its longer residence time is changed in viscosity and subjected to a faster chemical degradation compared with the fresher material flowing at the center of the passage. As a rule, the temperature distribution in the distributing passage at a certain distance from the feed screw exhibits at the center of the flow a temperature peak, which may exceed the average temperature by as much as 20° C. The molten stream has usually a high viscosity and slides on the layers which are close to the wall and is subjected to the shearing action of the wall so that additional heat is generated and the temperature of the molten material is increased and its viscosity is lowered. These layers which are close to the wall constitute the undesired boundary layers, which particularly in colored molten materials appear in the finished products as disturbing boundary line marks after a color change.

Numerous apparatus have been disclosed, which have been developed in order to eliminate an inhomogeneity in the molten material which has been processed by an extruder. The use of mixing tools which rotate in unison with the feed screws of the extruder, such as have been disclosed in U.S. Pat. No. 26,31,016 and German Patent Specification No. 11 97 438, has not produced satisfactory results. Better results have been produced by apparatus in which the molten material processed in the extruder is divided into partial streams, which are subsequently, recombined in a different relation to each other. Such apparatus are known, e.g., from Swiss Patent Specification No. 486,300, German Patent Specification No. 19 26 488, German Patent Publication No. 19 56 652 and German Patent Publication No. 21 29 971. But in said known apparatus it is possible to rearrange only portions of the boundary layers whereas other portions of the boundary layers are preserved and still become apparent as striplike boundary layer marks.

A thorough blending has been effected by means of a set of corrugated plates, which were placed in the molten stream and had confronting corrugations extending at right angles to each other. But the corrugations defined numerous dead corners so that the starting of the process was difficult because when the system had been heated to operating temperature it had to be rinsed for several hours in order to remove cross-linked particles.

It is an object of the invention to provide for an improved homogenization of the molten material in a passage for the transfer of molten material which has been processed in an extruder and to effect this in such a manner that the disturbing influences of boundary layers are eliminated or substantially reduced.

In a process of the kind described first hereinbefore that object is accomplished in that the molten stream is divided into sectorlike partial streams and adjacent ones of said partial streams are caused to flow radially inwardly and radially outwardly, respectively so that they recombine in two approximately concentric annular regions. In the process according to the invention the boundary layer is divided into strips and each of said strips is caused to flow inwardly or outwardly with the associated partial stream so that after the recombination of the partial streams the boundary layer strips extend again throughout the periphery and the outer boundary layer strips constitute a boundary layer which has only one-half the previous thickness because the now adjoining boundary layer strips have been extended to twice their former peripheral extent and those boundary layer strips which have been displaced inwardly constitute a boundary layer disposed in the central region of the molten stream. The molten stream is desirably divided several times and the partial streams formed by each of said dividing steps are recombined as described so that the boundary layers of the molten stream are caused to form relatively thin concentric annular layers. One dividing step according to the invention will result in the formation of two layers, two dividing steps will result in the formation of four layers, three dividing steps will result in the formation of eight superimposed layers and n dividing steps will result in the formation of $2^m$ superimposed layers. After the dividing step or steps the boundary layers no longer form strips but form extended, superimposed layers so that an effective homogenization is achieved and disturbing boundary layer marks will no longer appear.

The process according to the invention can be carried out by apparatus having passages which extend at an angle to each other and divide the molten stream into partial streams and cause said partial streams to be recombined in a different relation to each other. That apparatus is characterized in accordance with the invention by at least one annular distributing disc, which is provided on its entrance side with an annular series of openings, and in which adjacent ones of said openings are succeeded by bores which extend radially outwardly and radially inwardly, respectively.

An annular distributing disc which is known from German Patent Publication No. 20 23 910 comprises pairs of crossing flow passages, adjacent ones of which are radially inwardly and radially outwardly inclined respectively, so that said passages terminate on each of the entrance and exit sides of said disc in openings which are disposed on concentric annular regions and the passages effect only a rearrangement from the inside to the outside and vice versa of the streams of molten material flowing through the passages. As a result, boundary layer strips of unchanged thickness will be obtained in addition to strips of fresher material.

To permit a rearrangement of the boundary layer so as to form a plurality of concentric, thinner layers, another feature within the scope of the invention resides in that a distributing block is provided, which consists of at least two annular distributing discs and in which an annular passage is provided between any two adjacent ones of said discs and has an entrance gap corresponding to the width of the annular region which is defined by those openings of the bores which are arranged in approximately concentric rows on the exit side of the preceding distributing disc. In that embodiment those partial streams which are conducted outwardly and inwardly, respectively, by a preceding annular distributing disc are recombined by the convergent passage so that they can enter the entrance openings of the next succeeding distributing disc for the next dividing step.

Within the scope of the invention, the entrance and exit openings of each bore have funnel-like tapering or flaring passages associated with them and said passages are separated from adjoining passages by web- or bead-like partitions, which taper to form flow-dividing edges. In this manner the annular molten stream is divided into angularly spaced partial streams and the latter are subsequently recombined as extended, adjoining partial streams in two concentric rings.

The distributing disc provided by the invention may be provided on its entrance side stream with an annular groove which is centered on the axis of said disc and approximately V-shaped in cross-section and which is formed at its bottom with the openings succeeded by the bores which extend radially inwardly and outwardly. A plurality of such distributing discs can be disposed one behind the other so that they adjoin each other and can effect a plurality of dividing steps. In such an arrangement the largest width of the V-shaped groove suitably corresponds to the width of the annular region containing the openings of the bores on the exit side.

The distributing disc used within the scope of the invention or distributing blocks composed of such distributing discs may be arranged as stationary structures in a passage for transferring a molten stream, e.g., from an extruder to a die and in that case may be disposed in front of and closely spaced from a junction of the passage. Alternatively, they may be secured to the shaft of the feed screw of an extruder so that an improved mixing and an elimination of disturbing boundary layers are effected in the extruder.

In the use of the process and apparatus according to the invention the strips formed by the boundary layer are extended to such large areas and are superimposed so that the influence of a given boundary layer will no longer be disturbing.

Figure 2:
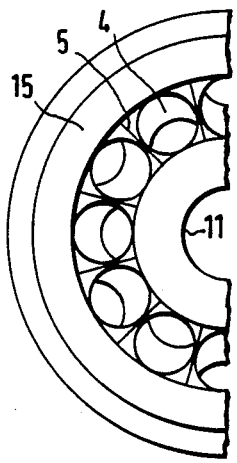
Figure 3:
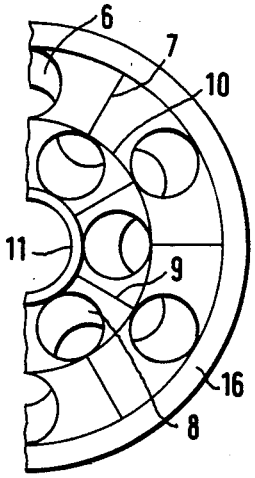
Figure 4:
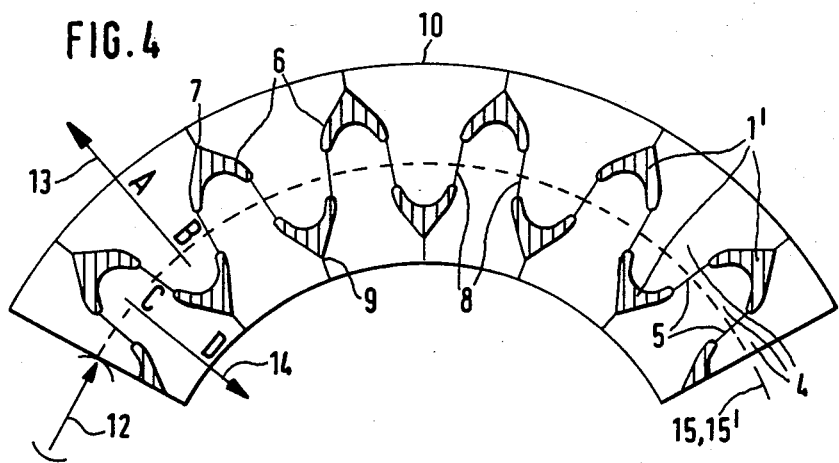
Figure 5:
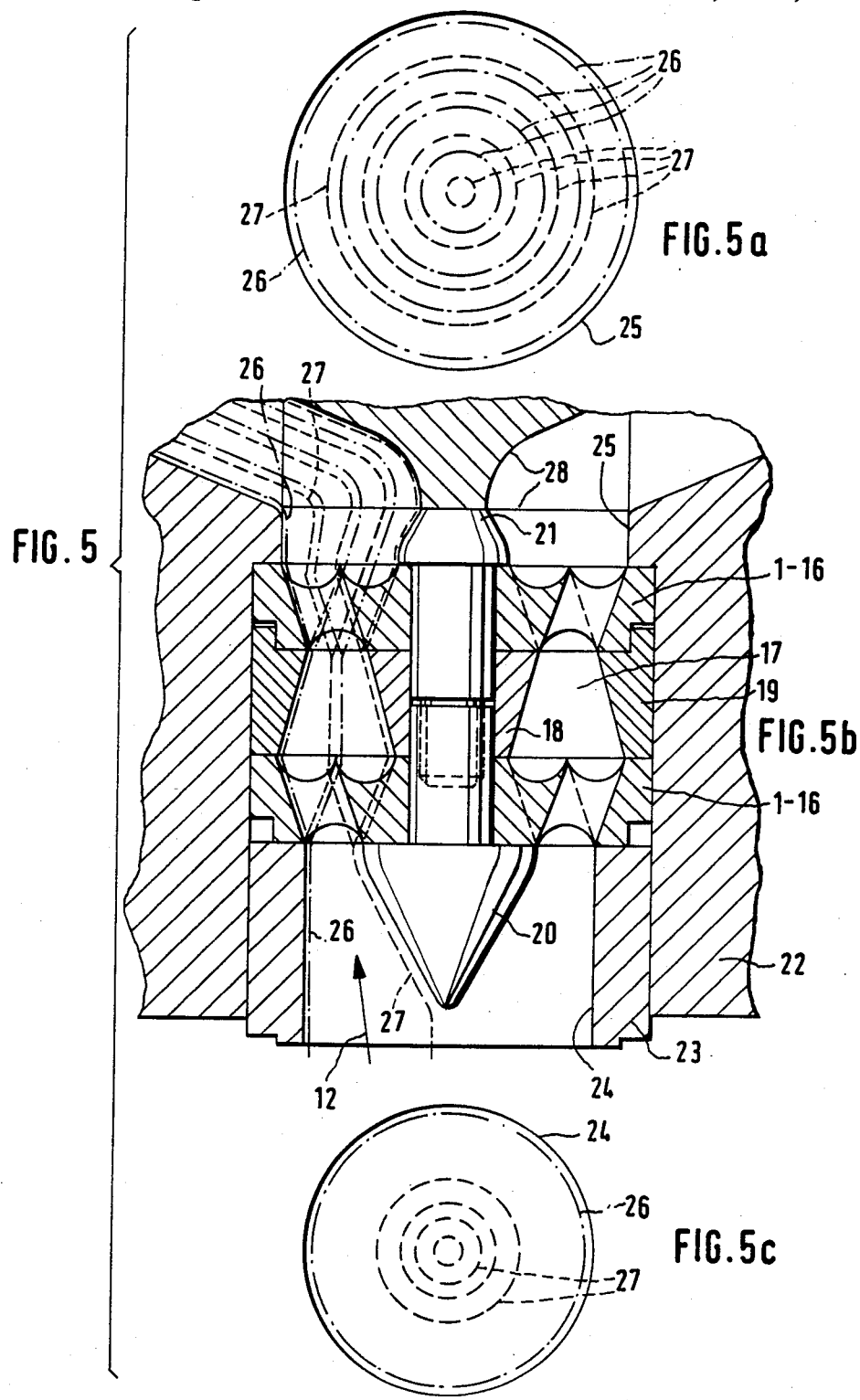

An illustrative embodiment of the invention will now be explained more fully with reference to the drawing, in which FIG. 1 is a longitudinal sectional view showing a radially symmetrical distributing disc, FIGS. 2 and 3 are elevations showing the distributing disc of FIG. 1 as viewed in the directions of the arrows II and III, respectively, in FIG. 1, FIG. 4 is a sectional view taken on two imaginary conical surfaces designated A-B and C-D in FIG. 1; the intersection of the section surfaces is indicated by a dotted line, FIG. 5 is a sectional view showing a distributing block composed of two distributing discs, FIG. 6 is a longitudinal sectional view showing a radially symmetrical distributing disc having a V-shaped entrance groove, FIGS. 7 and 8 are elevations showing the distributing discs of FIG. 6 as viewed from the entrance and exit sides, respectively.

FIG. 9 shows a distributing block composed of the distributing discs of FIGS. 6 to 8, FIG. 10 is a longitudinal sectional view showing a distributing disc mounted on the shaft of a feed screw, FIGS. 11 and 12 are elevations showing the distributing disc of FIG. 10 as viewed in the directions of the arrows II and III in FIG. 10, FIG. 13 is a sectional view taken on two imaginary conical surfaces designated A-B and C-D in FIG. 1; the intersection of the section surfaces is indicated by a dotted line; and FIG. 14 is a longitudinal sectional view showing a distributing block which is composed of four distributing discs, which are mounted on an extension of the shaft of the feed screw.

The distributing disc 1 is formed with passages 2 for conducting streams of molten material radially outwardly and with passages 3 for conducting streams of molten material radially inwardly. Each of the passages 2 and 3 has an entrance opening 4, the center of which is designated 15'. The surfaces between adjacent entrance openings 4 constitute flow-dividing edges 5. On the exit side of the disc 1, the radially outwardly extending passages 2 terminate in exit openings 6 and the radially inwardly extending passages 3 terminate in exit openings 8. Flow-dividing edges 7 are provided between adjacent openings 6 and flow-dividing edges 9 are provided between adjacent openings 8. The radial spacing of the two annular series of openings 6 and 8 is so selected that an annular flow-dividing edge 10 is provided between said series. The flow-dividing edges 5, 7, 9 and 10 which face the annular feed passage and the annular discharge passages do not define any dead corners so that a disturbing retention of material is precluded.

FIG. 4 shows a development along the two imaginary conical surfaces indicated by the section lines A-B and C-D. The approaching molten stream 12 is indicated by the arrow shown in parentheses and reaches the annular entrance surface 15. The dotted line having the same radius as the points 15' is disposed approximately in the middle of the annular surface 15. In FIG. 4, the developments corresponding to the section surfaces A-B and C-D are turned into the plane of the drawing about the dotted line. It is apparent from FIG. 4 that the wall portions 1' between the openings of the bores and between the flow-dividing edges 5, 7, 9 are relatively small so that the flow area is as large as possible. As is apparent from FIGS. 1 to 3, the entrance openings 4 and the associated flow-dividing edges 5 are intersected by the dotted line shown in FIG. 4.

A composite distributing block comprising two distributing discs 1 will now be explained with reference to FIG. 5. In the diagrammatically indicated housing 22, that distributing ring 1 which is disposed on the exit side bears on an annular step. Two conical sleeves 18, 19 are disposed between the two distributing rings 1 and define a convergent annular passage 17. The distributing discs 1 and the conical connecting sleeves 18, 19 are held together by bolts, which are screwed to each other and extend through central bores in the distributing discs and the inner sleeve. The bolt provided on the entrance side has a conical head 20 and the bolt provided on the exit side has an approximately frustoconical head 21, which adjoins the radially inner edge portions of the adjacent exit openings. On the entrance side, the distributor block is held by the sleeve 23, which is clamped against the housing by means which are not shown.

In the supply passage 24, the boundary layer 26 which is near the wall is diagrammatically indicated by a dash-dot line and the region in which a hot spot occurs at the center 27 of the stream is indicated by dotted lines. These lines extend through the first distributing disc 1, the convergent passage 17 and the second distributing disc 1. This indicates that the initially local faults 26, 27 are concentrically superimposed in the discharge passage 25 and are closely spaced apart therein so that any color change and/or thermal degradation which are associated with said layers can no longer be disturbing.

To relieve the relatively small cross-sections 1' of the walls between the passages in the distributing discs 1, the frustoconical head 21 of the connecting bolt on the exit side is suitably backed by an adjacent edge 28 for dividing the molten stream.

Because the overall length is small, the distributing discs and the distributing block composed of said discs present only a small resistance to the flow. Commercially available mixing devices have an overall length of as much as 4 D, where D is the outside diameter of the mixing element, and cannot effect a satisfactory mixing although they may increase the pressure to as much as 100 bars.

The distributing discs and the distributing block which have been described can be manufactured at relatively low cost. The most intricate part is the perforated disc with the diverting passages and the integrally formed flow-dividing edges. The distributing discs can be made at reasonable cost by copy milling, numerically controlled milling or precision casting and identical distributing discs 1 can be used in a set thereof. All other parts are simple parts made by turning on a lathe.

A distributing disc or a distributing block is suitably provided before each junction of a passage for transferring the molten material processed in an extruder, e.g. before a simple bifurcation of a passage, where a flow-dividing edge is provided; these junctions are used for a distribution of molten material from an extruder to two or more extruder heads. The distributing discs or the distributing block may also be provided in the extruder head proper if a division of the molten stream is required to provide for an improved flow behavior, e.g., in film-blowing heads having a plurality of distributing helices.

The distributing discs and distributing blocks have been described as radially symmetrical elements for use in circular-section flow passages but may be used in different configurations in flow passages which are rectangular in cross-section and have a large width and small height.

The distributing discs and distributing blocks can be used also in conjunction with intermittently operating machines for processing plastic materials for making thermoplastic and elastomeric products, for instance, in injection molding machines and in blow-molding machines for making hollow bodies.

The distributing disc shown in FIGS. 6 to 8 differs from the distributing disc shown in FIGS. 1 to 3 essentially only in that it is provided on its entrance side with a V-shaped groove 30 and the radially inward passages 2 and 3 extend radially outwardly and radially inwardly from the bottom of said groove. As is apparent from FIG. 9, the largest width of the V-shaped groove 30 equals the width of the annular region which contains the openings of the passages 2, 3 on the exit side so that the distributing discs 31 can be arranged directly one behind the other so that they adjoin each other and form a distributing block, as is apparent from FIG. 9.

The block which is composed of the distributing discs 31 is held together by a central bolt 32, which is provided at its ends with conical heads 33, 34, by which the stream is divided and the partial streams are caused to recombine at the center of the stream. The bolt 32 consists of two parts, which are screwed to each other, as is apparent from FIG. 9.

With reference to FIGS. 10 to 14, annular distributing discs 41 secured to the shaft of the feed screw of an extruder will now be explained. The distributing disc 41 is formed with passages 42 for conducting molten streams radially outwardly and with passages 43 for conducting molten streams radially inwardly. Each passage consists of a bore and the center lines of said bores cross on a peripheral line 45. On the exit side the radially outwardly conducting bores 42 terminate in openings 46, which are separated by curved flow-dividing edges 47, and the radially inwardly conducting passages 43 terminate in the openings 48, which are separated by flow-dividing edges 49. The circular series of openings 46 and 48 are radially spaced apart and are separated by an annular flow-dividing edge 50. The flow-dividing edges 47, 49 and 50 which face the annular discharge passages define no dead corners and there are no dead corners on the entrance side so that a retention of molten material will be precluded.

FIG. 13 shows the development along the imaginary conical section surfaces A-A and B-B and the molten stream approaching the annular entrance surface of the disc 41 is indicated by arrows 52. The dotted line 53, which is represented by the point 45 in FIG. 10, lies approximately in the middle of the annular entrance surface. In FIG. 13, the developments on the imaginary section surfaces A-A and B-B have been folded about the dotted line 53 into the plane of the drawing. It is apparent from FIG. 13 that the partitions 54 between the bores and the flow-dividing edges 45, 47, 49 are relatively thin so that the flow area is as large as possible. From FIGS. 10 to 12 it is apparent that the dotted line 53 shown in FIG. 13 intersects the edges of the bores 42, 43 and the flow-dividing edges 5.

The sense of rotation of the screw is indicated by the arrow 55. The arrow 52 indicates the direction of flow of the approaching molten stream. The arrow 56 indicates the molten stream which has been conducted to the outer annular region and the arrow 57 indicates the molten stream which has been conducted to the inner annular region. It is apparent from FIGS. 11 to 13 that the passages 42, 43 extend along helical lines.

A composite distributing block consisting of four distributing discs 41 mounted on the screw shaft 58 is apparent from FIG. 14.

What is claimed is:

1. A process of dividing and rearranging a stream of molten material which has a peripheral boundary layer and which is processed in an extruder for making thermoplastic and elastomeric products, said process comprising the steps of: dividing the molten stream into sector-like partial streams such that each of said partial streams includes a respective strip of the peripheral boundary layer of the molten stream; simultaneously causing adjacent ones of said partial streams to flow radially inwardly and radially outwardly, respectively; and recombining the partial streams in a different relation to each other in two approximately concentric annular regions with adjacent strips of the initial boundary layer located in peripheral and interior portions, respectively, of the recombined molten stream.

2. A process according to claim 1, wherein the dividing, flow direction causing and recombining steps are repeated.

3. Apparatus for dividing and rearranging a stream of molten material in an extruder wherein the molten stream has a peripheral boundary layer, said apparatus comprising: at least one annular distributing disc provided on an entrance side with an annular series of openings for dividing the molten stream into sector-like partial streams each including a respective strip of the peripheral boundary layer of the molten stream, and being provided on an exit side with two approximately concentric annular series of openings; adjacent ones of the entrance openings of the disc being connected to respective ones of the exit openings of the disc by passages in the form of bores succeeding the entrance openings and extending through the disc radially inwardly and radially outwardly, respectively, such that the partial streams flow through the bores in the disc and recombine back into a molten stream on the exit side of the disc in a different relationship in two approximately concentric annular regions with adjacent strips of the initial peripheral boundary layer located in peripheral and interior portions, respectively, of the recombined molten stream.

4. Apparatus according to claim 3 including a distributing block that includes at least two of said annular distributing discs and in which an annular passage is provided between two adjacent ones of said discs and has an entrance gap corresponding to the width of an annular region defined by openings of the bores which are arranged in approximately concentric rows on the exit side of the preceding distributing disc and has an exit gap corresponding to the width of an annular region defined by openings of the bores which are arranged in an annular row on an entrance side of the next distributing disc.

5. Apparatus according to claim 3, wherein the entrance and exit openings of each bore have funnel-like tapering or flaring passages associated with them and said passages are separated from adjoining passages by web- or beadlike partitions, which taper to form flow-dividing edges.

6. Apparatus according to claim 3, wherein the distributing disc is provided on its entrance side with an annular groove which is centered on the axis of said disc and approximately V-shaped in cross-section and which is formed at its bottom with the openings succeeded by the bores which extend radially inwardly and outwardly.

7. Apparatus according to claim 6, wherein the largest width of the V-shaped groove corresponds to the width of the annular region containing the openings of the bores on the exit side.

8. Apparatus according to claim 3, wherein the distributing disc is provided on its entrance side with a central distributing cone having a base disposed at the edges of the openings terminating the passages on the entrance side.

9. Apparatus according to claim 3, wherein the distributing disc is disposed in a passage for conducting molten material from an extruder to a die and is disposed in front of and closely spaced from a junction of said passage.

10. Apparatus according to claim 3, wherein the distributing disc is disposed in front of and closely spaced from a junction of the transfer passage of an extruding plant having a plurality of extruder heads.

11. Apparatus according to claim 3, wherein a series of distributing discs are disposed within an extruder head so that the exit ends of the concentrically arranged flow-conducting passages are disposed in front of a junction of a transfer passage or of an area in which the molten material is finally distributed over the die orifice and a last distributing disc of said series is supported by a bolt which has a head and bears on flow-dividing edges between the passages of an adjacent distributing disc.

12. Apparatus for dividing and rearranging a stream of molten material in an extruder wherein the molten stream has a peripheral boundary layer, said apparatus comprising: an extruder having a feed screw and a shaft connected thereto; an annular distributing disc secured to the shaft of the feed screw of the extruder and formed with passages which extend at an angle to each other and divide the molten stream into partial streams each including a respective strip of the boundary layer, and which cause said partial streams to be recombined in a different relation to each other back into a molten stream with adjacent strips of the initial boundary layer adjacent peripheral and interior portions, respectively, of the recombined molten stream, the distributing disc being provided with bores which define the passages and which terminate on an entrance side of the disc in a circular series of openings, and adjacent ones of said bores extending through the disc radially outwardly and radially inwardly, respectively.

13. Apparatus according to claim 12 wherein a conical spacer ring having a small end and a large end is disposed between adjacent annular distributing discs mounted on the shaft of the feed screw, the small end of said spacer ring adjoins radially inner edge portions of a radially inner circular series of openings on an exit side of one of said distributing discs and the large end of said spacer ring adjoins radially inner edge portions of the openings on the entrance side of the other distributing disc.

14. Apparatus according to claim 12, wherein the passages extend along helical lines corresponding to the helical flow lines of the molten stream.

15. Apparatus according to claim 6, wherein the distributing disc is provided on its entrance side with a central distributing cone having a base disposed at a radially inner edge of the V-shaped groove.

* * * * *